(12) United States Patent
Bossard (10) Patent No.: US 8,002,875 B1
(45) Date of Patent: Aug. 23, 2011

(54) SYSTEM AND METHOD FOR SEPARATING HYDROGEN GAS FROM A MIXED GAS SOURCE USING COMPOSITE STRUCTURE TUBES

(76) Inventor: Peter R. Bossard, Ivyland, PA (US)

( * ) Notice: Subject to any disclaimer, the term of this patent is extended or adjusted under 35 U.S.C. 154(b) by 609 days.

(21) Appl. No.: 11/522,004

(22) Filed: Sep. 18, 2006

Related U.S. Application Data

(63) Continuation-in-part of application No. 11/097,535, filed on Mar. 31, 2005, now Pat. No. 7,396,385, and a continuation-in-part of application No. 10/770,732, filed on Feb. 2, 2004, now Pat. No. 7,125,440.

(51) Int. Cl.
*B01D 53/22* (2006.01)

(52) U.S. Cl. ...................................... 95/55; 95/56; 96/8

(58) Field of Classification Search ................. 95/56, 55, 95/45
See application file for complete search history.

(56) References Cited

U.S. PATENT DOCUMENTS

| | | | | |
|---|---|---|---|---|
| 3,350,846 A * | 11/1967 | Makrides et al. | ................. | 95/56 |
| 3,706,534 A * | 12/1972 | Verheul et al. | ............. | 239/590.3 |
| 4,603,056 A * | 7/1986 | MacKinnon et al. | ......... | 427/579 |
| 4,699,637 A | 10/1987 | Iniotakis et al. | ................ | 55/158 |
| 5,205,841 A * | 4/1993 | Vaiman | ............................ | 95/46 |
| 5,498,278 A * | 3/1996 | Edlund | ............................ | 96/11 |
| 5,614,001 A | 3/1997 | Kosaka et al. | ..................... | 96/10 |
| 5,734,092 A | 3/1998 | Wang et al. | .................. | 73/23.25 |
| 5,888,273 A * | 3/1999 | Buxbaum | ......................... | 95/56 |
| 5,931,987 A * | 8/1999 | Buxbaum | ......................... | 95/55 |
| 6,152,987 A | 11/2000 | Ma et al. | ............................ | 95/56 |
| 6,228,146 B1 * | 5/2001 | Kuespert | .......................... | 95/46 |
| 6,461,408 B2 * | 10/2002 | Buxbaum | ......................... | 95/55 |
| 6,589,312 B1 * | 7/2003 | Snow et al. | ...................... | 75/255 |
| 2003/0190486 A1 | 10/2003 | Roa et al. | | |
| 2004/0237779 A1 | 12/2004 | Ma et al. | | |

OTHER PUBLICATIONS

Geankoplis (Transport Processes and Separation Process Principles) 4th ed., p. 89, Pearson Education, Inc. 2003.*

* cited by examiner

*Primary Examiner* — Duane Smith
*Assistant Examiner* — Anthony Shumate
(74) *Attorney, Agent, or Firm* — LaMorte & Associates (57) ABSTRACT

A hydrogen purification system that is used to separate hydrogen gas from a mixed gas source. The hydrogen purification system includes a hydrogen separator. Within the hydrogen separator is a first chamber into which the mixed gas source is fed. A plurality of tubes extend into the first chamber. Each of the plurality of tubes is permeable only to hydrogen. Gap spaces exist within the first chamber in between any of the plurality of tubes that are arranged in adjacent positions. The mixed source gas passes through the gap spaces as it permeates the first chamber. The mixed gas source spreads thinly over the exterior of the tubes within the confines of the gap spaces. Hydrogen from the mixed gas source permeates thru the tube walls and into the interior of the tubes that are in parallel and the hydrogen is collected in a chamber.

13 Claims, 6 Drawing Sheets

SYSTEM AND METHOD FOR SEPARATING HYDROGEN GAS FROM A MIXED GAS SOURCE USING COMPOSITE STRUCTURE TUBES

RELATED APPLICATIONS

This application is a continuation-in-part of application Ser. No. 10/770,732, filed Feb. 2, 2004 now U.S. Pat. No. 7,125,440, entitled Composite Structure For High Efficiency Hydrogen Separation And Its Associated Methods Of Manufacture And Use.

This application is also a continuation-in-part of application Ser. No. 11/097,535, filed Mar. 31, 2005 now U.S. Pat. No. 7,396,385, entitled System And Method For Efficiently Separating Hydrogen Gas From A Mixed.

BACKGROUND OF THE INVENTION

1. Field of the Invention

The present invention relates to systems and methods that are used to separate hydrogen from a volume of mixed gas. More particularly, the present invention is related to systems and methods that separate hydrogen from a volume of mixed gas by exposing the mixed gas to a hydrogen permeable material through which only atomic hydrogen can readily pass.

2. Prior Art Description

In industry, there are many applications for the use of purified hydrogen. However, in many common processes that produce hydrogen, the hydrogen gas produced is not pure. Rather, when hydrogen is produced, the resultant gas is often contaminated with water vapor, hydrocarbons and/or other contaminants. In many instances, however, it is desired to have ultra pure hydrogen. In the art, ultra pure hydrogen is commonly considered to be hydrogen having purity levels of at least 99.999%. In order to achieve such purity levels, hydrogen gas must be actively separated from its contaminants.

In the prior art, one of the most common ways to purify contaminated hydrogen gas is to pass the gas through a conduit made of a hydrogen permeable material, such as palladium or a palladium alloy. As the contaminated hydrogen gas passes through the conduit, atomic hydrogen permeates through the walls of the conduit, thereby separating from the contaminants. In such prior art processes, the conduit is kept internally pressurized and is typically heated to at least three hundred degrees Centigrade. Within the conduit, molecular hydrogen disassociates into atomic hydrogen on the surface of the conduit and the conduit absorbs the atomic hydrogen. The atomic hydrogen permeates through the conduit from a high pressure side of the conduit to a low pressure side of the conduit. Once at the low pressure side of the conduit, the atomic hydrogen recombines to form molecular hydrogen. The molecular hydrogen that passes through the walls of the conduit can then be collected for use. Such prior art systems are exemplified by U.S. Pat. No. 5,614,001 to Kosaka et al., entitled Hydrogen Separator, Hydrogen Separating Apparatus And Method For Manufacturing Hydrogen Separator.

The flow rate of hydrogen gas through the walls of a conduit is proportional to the length of the conduit and the thickness of the walls of the conduit. Thus, a highly efficient purification system would have a very long, very thin conduit to maximize flow rate. However, palladium is a very expensive precious metal. Consequently, conduits made of palladium and palladium alloys are very expensive to manufacture. As such, it is desirable to use as little of the palladium as possible in manufacturing a hydrogen gas purification system. Furthermore, conduits made from palladium and palladium alloys typically hold gas under pressure and at high temperatures. Accordingly, the walls of the conduit cannot be made too thin, otherwise the conduit will either rupture or collapse depending upon the pressure gradient present across the wall of the conduit.

A typical prior art hydrogen separator uses coils made from palladium tubing. Coils are used to maximize the surface area of the palladium within a confined space. However, there are many disadvantages associated with the use of coiled tubing. In order for a palladium based hydrogen separator to work, it must be heated to a temperature in excess of 300 degrees Centigrade. As palladium coils are heated to such temperatures, they expand. Furthermore, as hydrogen diffuses through the walls of the palladium coils, the palladium expands significantly. As a palladium coil is repeatedly expanded and contracted, the palladium coil twists. The twisting of the palladium coils fatigues the palladium and causes the palladium to become brittle. Eventually, a palladium coil will crack and the hydrogen separator will cease to work.

Another disadvantage of hydrogen separators that use coiled palladium tubing is that the coils of palladium are very susceptible to vibration damage. The palladium coils within a hydrogen separator act as springs. If the hydrogen separator experiences any vibrations during operation, those vibrations resonate within the palladium coils, causing the palladium coils to move. As the palladium coils resonate and move, the palladium experiences fatigue and becomes brittle. This eventually causes the palladium coils to crack and fail.

Yet another disadvantage of hydrogen separators that use palladium coils is that of contaminant gas back up. If a hydrocarbon rich gas is introduced into a palladium coil, some hydrogen will disassociate from the hydrocarbon and will pass through the wall of the palladium coil. What is left behind in the palladium coil is mostly carbon and oxygen, which forms carbon dioxide and carbon monoxide. The carbon dioxide and carbon monoxide fill the palladium tube. New hydrocarbon gas must therefore diffuse through this contaminant gas before it can reach the surface of the palladium coil. If there is a large back up of contaminant gas, the hydrocarbons may take a very long time to reach a palladium surface. Hydrogen in the supply gas must be able to reach the palladium surface in a timeframe that is short compared to the residence time of gas in the coil. However, the concentration of the non-hydrogen component in the supply gas will increase gradually as more and more hydrogen is removed as the gas stream progresses through the coil. This greatly reduces the efficiency of the hydrogen separator. If the flow in the palladium tubing is increased to flush out contaminant gas, hydrocarbons may flow through the palladium tubing before ever having a chance to lose hydrogen through the palladium. This too greatly reduces the efficiency of the hydrogen separator.

To further complicate matters, conduits made from palladium and palladium alloys may become less efficient over time as the interior walls of the conduits become clogged with contaminants. In order to elongate the life of such conduits, many manufacturers attempt to clean the conduits by reverse pressurizing the conduits. In such a procedure, the exterior of the conduit is exposed to pressurized hydrogen. The hydrogen passes through the conduit wall and into the interior of the conduit. As the hydrogen passes into the interior of the conduit, the hydrogen may remove some of the contaminants that have deposited on the interior wall of the conduit.

Due to the generally cylindrical shape of most prior art hydrogen purification conduits, the conduits are capable of withstanding a fairly high pressure gradient when the interior of the conduit is pressurized higher than the exterior of the conduit. However, when such conduits are cleaned and the external pressure of the conduit is raised higher than the interior pressure, a much lower pressure gradient must be used, otherwise the conduits will implode.

In the prior art, improved conduit designs have been developed that attempt to minimize the amount of palladium used in a conduit, yet increase the strength of the conduit. One such prior art device is shown in U.S. Pat. No. 4,699,637 to Iniotakis, entitled Hydrogen Permeation Membrane. In the Iniotakis patent, a thin layer of palladium is reinforced between two layers of mesh. The laminar structure is then rolled into a conduit. Such a structure uses less palladium. However, the conduit is incapable of holding the same pressure gradient as solid palladium conduits. Accordingly, the increase in efficiency provided by the thinner palladium layer is partially offset by the decreased pressure limits, and thus gas flow rate, that are capable of being processed.

Another prior art approach to limiting the amount of palladium used is to create membranes that are placed over apertures, like a skin on a drum. A pressure gradient is then created on opposite sides of the membrane, thereby causing hydrogen to flow through the membrane. Such prior art systems are exemplified by U.S. Pat. No. 5,734,092 to Wang et al., entitled Planar Palladium Structure. A problem associated with such prior art systems is that the palladium or palladium alloy membrane is typically positioned in a level plane, wherein a pressure gradient exists from one side of the membrane to the other. Since the membrane is flat, it has little structural integrity when trying to resist the forces created by the pressure gradient. Accordingly, in order to prevent the membrane from rupturing, solid perforated substrates are used to reinforce the membrane. The solid perforated substrates, however, are complicated to manufacture, restrict the flow through the membrane, and reduce the efficiency of the overall system.

U.S. Pat. No. 6,152,987 to Ma, entitled Hydrogen Gas-Extraction Module And Method Of Fabrication, discloses a hydrogen separator where a solid layer of hydrogen permeable material is deposited over a porous substrate of dissimilar material. The porous substrate supports the hydrogen permeable material and provides much more support than prior art mesh support systems. However, the porous substrate only allows gas to contact the hydrogen permeable material where a pore gap is exposed to the hydrogen permeable material. This configuration greatly limits the area of hydrogen permeable material actually exposed to gas. Furthermore, due to differences in thermal coefficients and other physical properties, hydrogen permeable material deposited on a substrate of a dissimilar material tends to separate from the substrate. This can cause leakage of contaminated gas through the hydrogen permeable material and the eventual failure of the system.

U.S. Patent Application No. 2003/0190486 to Roa et al, also discloses a hydrogen separator where a solid layer of hydrogen permeable material is deposited over a porous substrate of dissimilar material. In the Roa application, a palladium alloy is deposited over the porous substrate of dissimilar material using a first electroplating process. Copper is then deposited on the palladium in a second electroplating process. The palladium and copper layers are then annealed to produce a palladium alloy in place on the substrate. However, the porous substrate again only allows gas to contact the hydrogen permeable material where a pore gap is exposed to the hydrogen permeable material. This configuration greatly limits the area of hydrogen permeable material actually exposed to gas.

Furthermore, palladium alloy does not bond well to the porous substrate of dissimilar material. This leads to eventual failure. In prior art systems, such as the previously cited Ma patent and the Roa application, where palladium alloy is deposited directly on a porous substrate, another problem is that the substrates have large pore sizes to maximize exposure of the palladium alloy to gas. This requires that thick uneven layers of palladium be deposited over the porous substrate to cover the pores of the substrate. This causes faults in the layer of palladium that tend to fail over time.

Attempts have been made to eliminate these problems by creating a porous structure of a palladium alloy and then coating this porous structure with a solid layer of the same palladium alloy. In U.S. Patent Application Publication No. 2004/0237779 to Ma, entitled Composite Gas Separation Modules Having Intermediate Porous Metal Layers, a porous stainless steel substrate is provided. A porous intermediate layer of palladium alloy is then created by electroplating the palladium alloy directly onto the stainless steel. Finally, a solid layer of palladium alloy is deposited onto the porous intermediate layer.

In such systems, the porous layer of palladium alloy is still deposited directly onto the porous substrate of dissimilar material. The dissimilar materials bond poorly resulting in many eventual detachment flaws. More importantly, the intermediate palladium alloy layer is deposited using electroplating techniques. In electroplating, ions of a metal are drawn through an electroplating solution. Such an electroplating solution contains hydrocarbons. As the ions of palladium alloy are deposited onto the porous stainless steel substrate, the deposited particles of palladium alloy tend to become coated in carbon from the electroplating solution. The carbon coating on the deposited particles of palladium alloy prevent hydrogen from being able to permeate through the palladium alloy. Rather, the carbon acts as a physical barrier between the palladium alloy and the hydrogen. This greatly inhibits the performance of the hydrogen separator.

A need therefore exists in the art of hydrogen purification for a system and method that can handle high flow rates of gas per unit area, and yet uses only a minimal amount of hydrogen permeable material. A need also exists for a hydrogen purification system with a hydrogen permeable layer that is strongly bonded to its supporting substrate and unobstructed by carbon, so that it can more reliably pass hydrogen while withstanding large pressure gradients and repeated temperature cycles over longer periods of time. These needs are met by the present invention as described and claimed below.

SUMMARY OF THE INVENTION

The present invention is a hydrogen separator assembly and method that is used to separate hydrogen gas from a mixed gas source. Within the hydrogen separator assembly is a first chamber into which the mixed gas source is fed. A plurality of tubes extend into the first chamber where they are exposed to the mixed gas source. Each of the plurality of tubes is permeable only to atomic hydrogen. Gap spaces exist within the first chamber in between any of the plurality of tubes that are arranged in adjacent positions.

The mixed source gas passes through the gap spaces as it permeates the first chamber. The mixed gas source spreads thinly over the exterior of the tubes within the confines of the gap spaces. Hydrogen from the mixed gas source disassociates into atomic hydrogen, permeates into the tubes and is collected. The hydrogen gas component of the mixed gas source is therefore separated.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention system provides a means for purifying a hydrogen gas at a high flow rate, using a small amount of space and a small amount of precious metals.

Figure 1:
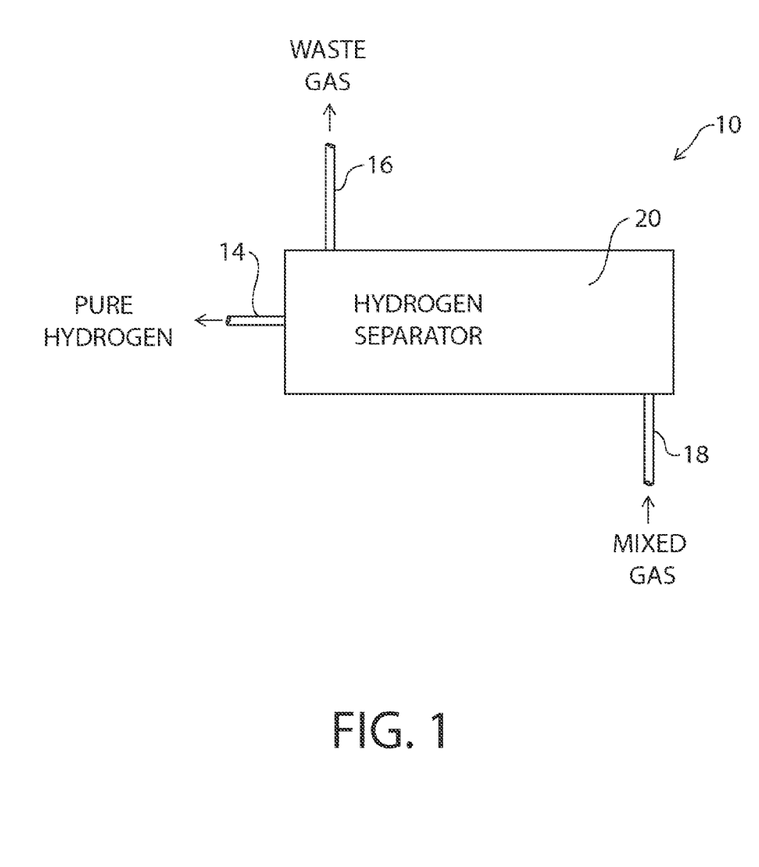
FIG. 1 is a schematic of an exemplary embodiment of a hydrogen purification system.

Referring to FIG. 1, there is shown a schematic of an exemplary embodiment of a hydrogen purification system 10 in accordance with the present invention. The hydrogen purification system 10 contains a hydrogen separator 20. The hydrogen separator 20 is coupled to a source of mixed gases that contain hydrogen gas. For example, the mixed gases can be the resultant gases from a water gas shift reaction of a hydrocarbon fuel, such as diesel fuel, ethanol, gasoline. The mixed gases enter the hydrogen separator through supply port 18.

The hydrogen separator 20 is heated to an operating temperature either by externally heating elements or by the temperature of the gases that pass into the hydrogen separator 20. The hydrogen separator 20 separates hydrogen from the contaminated gas source, thereby producing ultra pure hydrogen and waste gas. The ultra pure hydrogen is collected though a hydrogen collection port 14. The waste gas is collected through a waste gas collection port 16.

Figure 2:
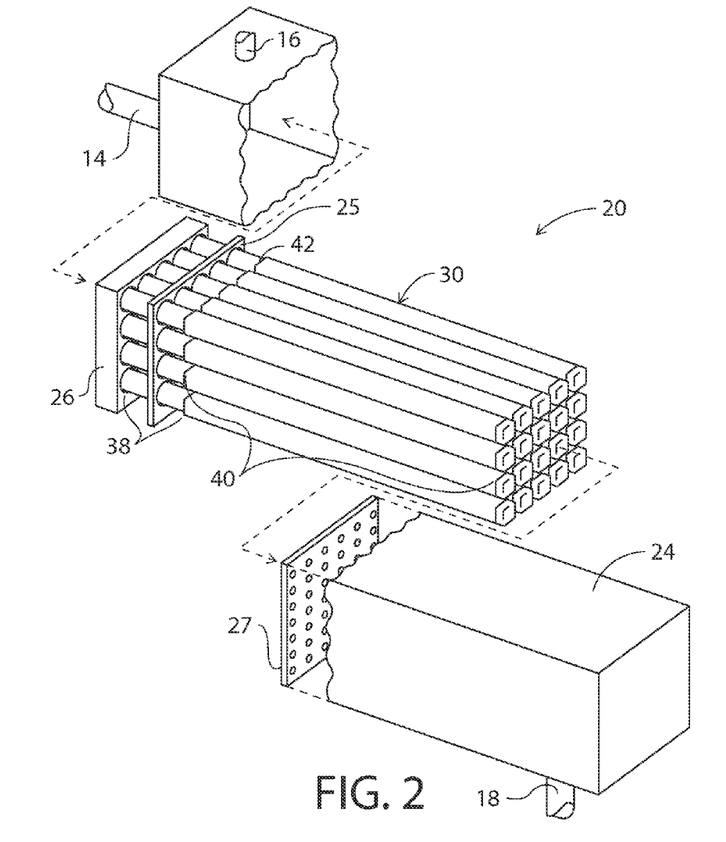
FIG. 2 is an exploded view of an exemplary hydrogen separator.

The contaminated source gas enters the hydrogen separator 20 through the supply port 18. Referring to FIG. 2, in conjunction with FIG. 3, it can be seen that the hydrogen separator 20 is comprised of an enclosed housing 24 that is internally divided into multiple chambers. The multiple chambers include a distribution chamber 19, a diffusion chamber 22, a waste collection chamber 21 and a hydrogen collection chamber 23. The hydrogen collection chamber 23 is disposed between the first end 29 of the enclosed housing and a partition wall 26. The waste collection chamber 21 is disposed between the partition wall 26 and a flow restriction barrier 25. The diffusion chamber 22 is disposed between the flow restriction chamber 25 and a perforated plate 27. Lastly, the distribution chamber 19 is disposed between the perforated plate 27 and the second end 31 of the enclosed housing 24.

Figure 3:
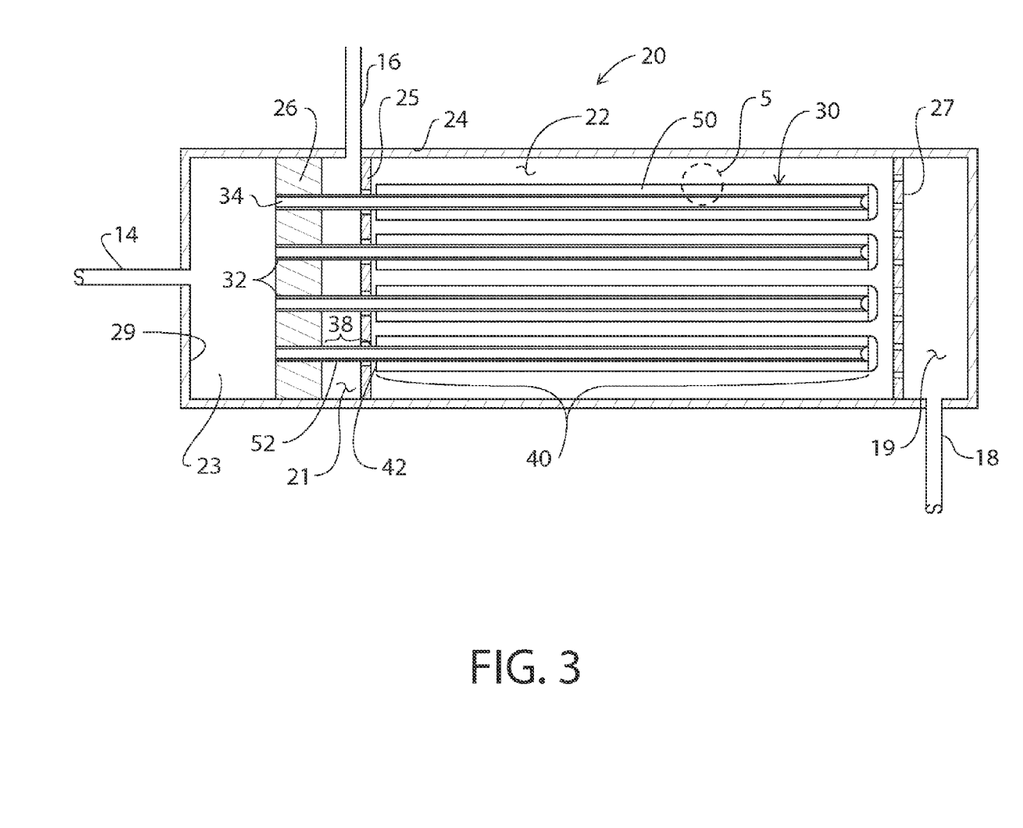
FIG. 3 is a cross-sectional view of the hydrogen separator shown in FIG. 2.

The enclosed housing 24 is preferably made of stainless steel or another high strength alloy that is non-reactive to any of the component gases contained within the contaminated source gas. The partition wall 26, flow restriction barrier 25 and perforated plate 27 are preferably made from the same material as is the enclosed housing 24 so that these components share the same thermal expansion characteristics.

The partition wall 26 is defines a plurality of holes 32 that are symmetrically arranged in a highly space efficient manner. The holes 32 are preferably spaced as densely as possible while still maintaining a predetermined minimum area of material around each of the holes 32.

A plurality of composite collection tubes 30 extend from the partition wall 26. The composite collection tubes 30 are joined to the partition wall 26 in, or around, each of the holes 32. In the shown embodiment, the end of each composite collection tube 30 passes into a hole 32, wherein it is welded, brazed or soldered into place. It will therefore be understood that although the composite collection tubes 30 extend through the waster collection chamber 21, through the flow restriction barrier 25 and into the diffusion chamber 22, the interior of each of the composite collection tubes 30 communicates only with the hydrogen collection chamber 23. Consequently, any gas flowing into the hydrogen collection chamber 22 must first pass through the defining structure of the composite collection tubes 30.

Each composite collection tube 30 has a first end 34 and an opposite second end 36. The first end 34 of each composite collection tube 30 attaches to the partition wall 26. The second end 29 of each collection tube 30 extends forward into the diffusion chamber 22 as a suspended cantilever.

Each of the composite collection tubes 30 is a complex manufactured assembly. Each composite collection tube 30 is divided along its length into two sections. An inactive section 38 extends from the first end 34 to a transition point 42. Accordingly, the inactive section 28 of each composite collection tube 30 extends through the waste collection chamber 21 and flow restriction barrier 25. A second active section 40 extends through the diffusion chamber 22 from the transition point 42 to the second end 36.

The inactive section 38 of each composite collection tube 30 is defined by a gas impervious tube wall. The active section 40 of each composite collection tube 30 is permeable to atomic hydrogen at the operating temperatures of the hydrogen separator 20. The second ends 29 of the composite collection tubes 30 are sealed. In the shown embodiment, an internal end cap 44 is internally brazed in place at the second end 36 of each of the composite collection tubes 30. The end caps 44 are preferably brazed to the inside of the composite collection tubes 30. In this manner, the end caps 44 do not restrict the composite collection tubes 30 from expanding outwardly when heated and saturated with molecular hydrogen.

The capped ends of each of the composite collection tubes 30 are also a predetermined distance from the perforated plate 27. The predetermined distance is greater than any change in length of the composite collection tubes 30 caused by temperature and hydrogen swelling. In this manner, the composite collection tubes 30 are free to expand without restriction.

The composite collection tubes 30 are straight. Consequently, mechanical stresses caused by differences in thermal and hydrogen expansion are minimized. The composite collection tubes 30 are supported at one, and only one, fixed point along the length of each tube. This basic concept allows the composite collection tube 30 to expand freely under varying temperature and hydrogen absorption conditions.

Figure 4:
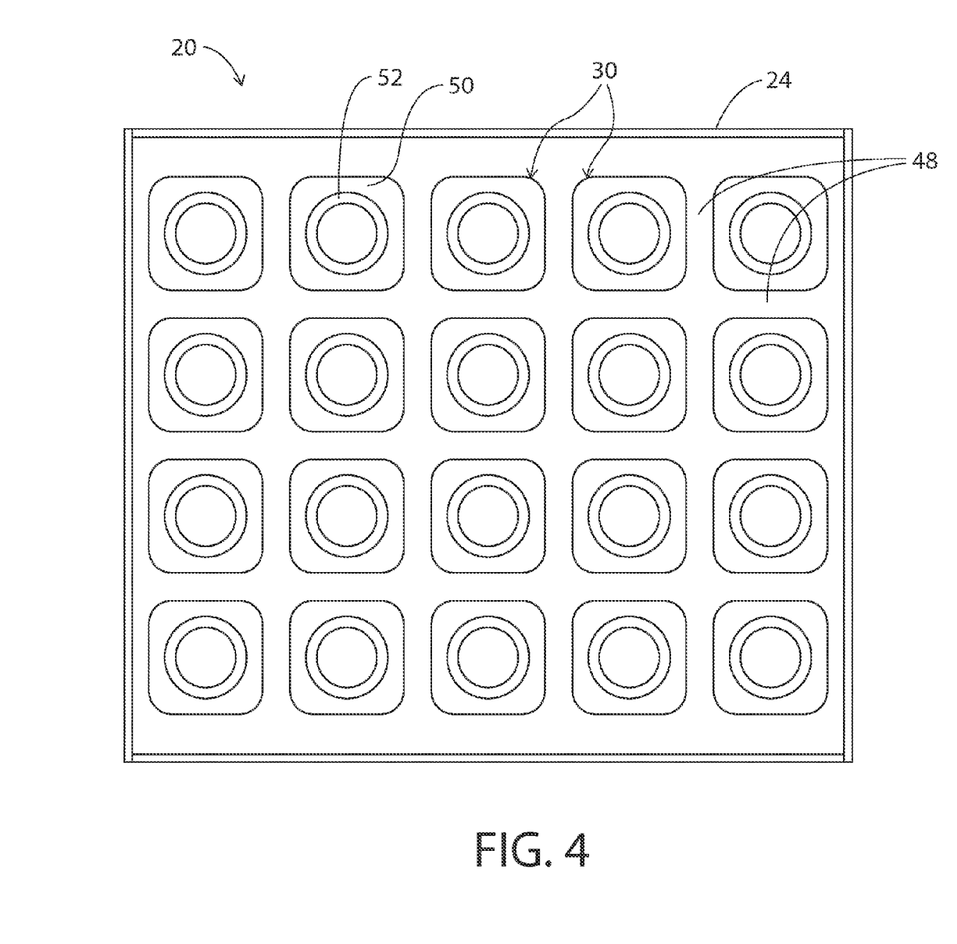
FIG. 4 is another cross-sectional view of the hydrogen separator shown in FIG. 2.

Referring to FIG. 4, it can be seen that the composite collection tubes 30 are arranged in a matrix. The illustrated number of rows and columns is merely exemplary and it should be understood that any plurality of composite collection tubes 30 can be used.

In the shown embodiment, the composite collection tubes 30 have a square rectangular profile. Such a shape is used because it creates a uniform gap space 48 in between all of the composite collection tubes 30 and in between the composite collection tubes 30 and the enclosed housing 24. However, it should be understood that the composite collection tubes 30 can have other profile shapes, such as round, that would result in an average gap space between composite collection tubes 30 and between the composite collection tubes 30 and the enclosed housing 24.

By having a uniform gap space 48 between the various composite collection tubes 30 and between the composite collection tubes 30 and the enclosed housing 24, it will be understood that the spaces in which the contaminated gas flows is tightly controlled. The size of the gap space 48 is dependent upon the wall thickness of the composite collection tubes 30. Preferably, the size of the gap space 48 is between two times (2×) and fifty times (50×) the wall thickness of the composite collection tubes 30. The gap space 48 runs along the length of each of the composite collection tubes 30. This length is preferably between three inches and twelve inches. The size of the gap space 48 is important to the functionality of the hydrogen separator 20. As the contaminated source gas flows through the gap space 48, the flowing gas spreads thinly over the outside surfaces of the composite collection tubes 30. The length and width of the gap space 48, as well as the gas flow rate, are engineered to maximize the efficiency at which the hydrogen gas permeates through the composite collection tubes 30. By spreading the contaminated gas thinly over the surfaces of the composite collection tubes 30, the hydrogen contained within the contaminated gas does not have to diffuse far before it contacts hydrogen permeable material. In this manner, a high percentage of the hydrogen available in the contaminated gas is provided with the opportunity to disassociate from the contaminated gas and pass through the composite collection tube 30. Depending upon operating parameters, a hydrogen diffusion efficiency well in excess of eighty percent can be achieved.

Referring both to FIG. 3 and FIG. 4, it will be understood that in operation, the enclosed housing 24 and all its contents are heated to an operating temperature in excess of 300 degrees Centigrade. Mixed gases are introduced into the distribution chamber 19. The mixed gases fill the distribution chamber 19 and pass through the perforations in the perforated plate 27. The perforated plate 27 therefore acts as a manifold, enabling the mixed gases to pass into the diffusion chamber 22 evenly across the entire area of the perforated plate 27.

As the mixed gases enter the diffusion chamber 22 through the perforated plate 27, the mixed gases flow through the gap spaces 48 that exist between and around the composite collection tubes 30. Hydrogen molecules contained within the waste gases come into contact with the composite collection tubes 30. Once in contact with the material of the composite collection tubes 30, the molecular hydrogen disassociates into atomic hydrogen and passes into the material of the composite collection tubes 30.

As atomic hydrogen passes through the composite collection tubes 30, it recombined into molecular hydrogen inside the composite collection tubes 30. The hydrogen gas then passes into the hydrogen collection chamber 23. The hydrogen gas in the hydrogen collection chamber 23 is then drawn out of the second chamber 23 for use. The hydrogen gas is ultra pure, being that pure hydrogen is capable of dissociating into atomic hydrogen and passed through the composite collection tubes 30.

The non-hydrogen components of the contaminated source gas flow through the gap spaces 48 and into the waste collection chamber 21. In order for the waste gases to reach the waste collection chamber 21, the waste gases must flow through the flow restriction barrier 25. The flow restriction barrier 25 defines small holes through which the composite collection tubes 30 pass. The gaps between around the composite collection tubes 30 are small. Accordingly, only a small controlled volume of waste gases pass from the diffusion chamber 22 into the waste collection chamber 21. By regulating the flow of waste gases out of the diffusion chamber 22 and creating a well distributed flow of waste gases into the diffusion chamber 22, an even laminar flow of waste gases is created through the gaps 48 between the composite collection tubes 30. This enables the hydrogen in the mixed gases to fully react with the material of the composite collection tubes 30.

The pressure of the hydrogen collection chamber 23 is kept lower than the pressure of the diffusion chamber 22. In this manner, there is a positive pressure differential between the gap space 48 and the interior of the composite collection tubes 30 is maintained. This encourages the flow of hydrogen through the composite collection tubes 30 and into the hydrogen diffusion chamber 23.

Referring to FIG. 4 in conjunction with FIG. 3, it can also be seen that the active section 38 of each of the composite collection tubes 30 has a composite wall structure 50. In the center of the composite wall structure 50 is a segment of a tubular support 52. The tubular support 52 extends the length of the entire composite collection tube 30. In the inactive section 38 of the composite collection tube 30, the tubular support 52 is gas impervious. However, in the active section 40 of the composite collection tube 30, it is highly gas pervious. The tubular support 52 is preferably made using a metal powder sintering technique. Such a technique lends itself to producing porous structures. The inactive section 38 of each composite collection tube 30 may then be heat treated, dipped, plated or otherwise treated in a secondary process to make the inactive section 38 nonporous.

The tubular supports 52 are preferably made of the same non-reactive material as is the enclosed housing 24 and the partition wall 26. In this manner, the partition wall 26, and the tubular supports 52 have the same coefficient of thermal expansion as does the enclosed housing 24.

Figure 5:
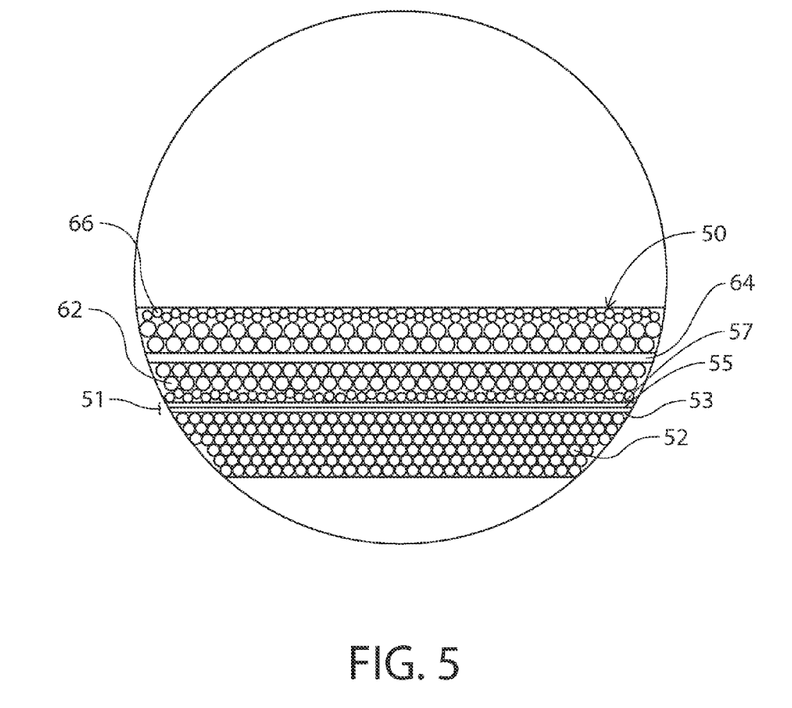
FIG. 5 is an enlarged view of section 5, shown in FIG. 3.

Referring to FIG. 5, it can be seen that the composite wall structure 52 that makes up the active section 40 of a composite collection tube 30 changes across its width. The first layer of the composite wall structure 50 is the tubular support 52. The tubular support 52 is made of a non-reactive metal or metal alloy that in itself is not hydrogen permeable. In a preferred embodiment, the material selected for the tubular support 52 is stainless steel, tungsten or molybdenum. Regardless, the tubular support 52 is porous and allows hydrogen gas to freely pass through the pores of its structure. Preferably, the tubular support 52 is manufactured so that it has a pore size of approximately 0.7 µm prior to sintering. However, larger and smaller pore sizes can be used.

To promote strong bonding to the tubular support 52, at least one bonding layer is deposited onto the tubular support 52. In the exemplary embodiment, three bonding layers 51 are used. The bonding layers 51 are thin so that they do not close the pores in the tubular support 52. The first bonding layer 53 is preferably nickel or chromium, the primary alloy metals of stainless steel. The first bonding layer 53 is deposited directly onto the tubular support 52, which is assumed to be stainless steel for this example. The first bonding layer 53 therefore strongly bonds with the metal of the tubular support 52.

The second bonding layer 55 is preferably a layer of tungsten or a similar metal in the same family. The tungsten is deposited over the first bonding layer 53 and bonds to the material of the first bonding layer 53.

The third bonding layer 57 is a layer of copper or silver, depending upon the palladium alloy to be used in the hydrogen separator 20. If a palladium-silver alloy is used, silver is used as the third bonding layer 57. However, it is preferred that a palladium-copper alloy be used. As such, copper is preferably used as the third bonding layer 57. The silver or copper acts as a wetting layer in that it covers the second bonding layer 55 of tungsten and provides a surface onto which a palladium alloy can directly diffusion bond.

A first porous layer 62 of hydrogen permeable material is then formed upon the bonding layers 51. The first porous hydrogen permeable layer 62 is preferably made from prefabricated nano particles of a palladium alloy, such as $Pd_{1-x}Ag_x$ or $Pd_{1-x}Cu_x$. However, other known hydrogen permeable alloys can also be used. Such alloys include, but are not limited to, PdRu, PdAu, PdNi, and PdFe. It will be understood that with these alternate alloys, the composition of the bonding layers 51 will change to better bond with the selected alloy.

It should also be understood that the hydrogen permeable layer 62 may also be fabricated from ceramic nano particles that are coated with a hydrogen permeable material, such as palladium, tantalum, vanadium or niobium.

The first porous layer 62 can be made from nano particles of a single size. However, in a preferred embodiment, the size of the palladium alloy nano particles in the first porous layer 62 are graduated. As such, the palladium alloy nano particles become smaller the further those nano particles are from the bonding layers 51.

A solid layer 64 of palladium alloy or another hydrogen permeable material is deposited over the first porous hydrogen permeable layer 62. The hydrogen permeable material selected for the solid layer 64 is preferably the same material selected for the first porous hydrogen permeable layer 62. In this manner, the solid layer 64 and the first porous hydrogen permeable layer 62 share physical characteristics, such as thermal expansion. Furthermore, by using the same hydrogen permeable material, the solid layer 64 of hydrogen permeable material can be diffusion bonded to the first porous hydrogen permeable layer 62.

The deposited solid layer 64 of hydrogen permeable material is preferably between 0.05 microns and 0.20 microns thick. The deposited solid layer 64 diffusion bonds with the first porous hydrogen permeable layer 62. The deposited solid layer 64 seals the pores of the first porous hydrogen permeable layer 62. As such, any hydrogen gas traveling through the composite wall structure 50 must permeate through the deposited solid layer 64 in order to advance.

Above the deposited solid layer 64 of hydrogen permeable material is a second porous hydrogen permeable layer 66. The second porous hydrogen permeable layer 66 is made of a hydrogen permeable material. The second porous hydrogen permeable layer 66 is manufactured to be porous. As such, the deposited solid layer 64 of hydrogen permeable material is interposed in between two porous layers 62, 66 of hydrogen permeable material. The second porous hydrogen permeable layer 66 can be formed into any profile shape, such as the square shape of the exemplary embodiment. The second porous hydrogen permeable layer can be made from any of the prefabricated nano particles of hydrogen permeable material that were previously listed for use in the first hydrogen permeable layer 62.

The tubular support 52 of non-reactive metal at the base of the composite wall structure 50 provides the composite wall structure 50 with physical strength. The tubular support 52, therefore, prevent the composite collection tubes 30 from being easily inwardly crushed or outwardly expanded. Accordingly, the composite collection tubes 30 can withstand large pressure differentials without inwardly or outwardly deforming.

The first porous hydrogen permeable layer 62 and the second porous hydrogen permeable layer 66 serve two purposes. First, these layers physically support the deposited solid layer 64 of hydrogen permeable material on either side of the solid layer 64. Accordingly, the solid layer 64 of hydrogen permeable material is fully supported at nearly all points along its surface. However, although most all points of the solid layer 64 are supported, the entire solid layer 64 remains active in the permeation of hydrogen gas because the supporting porous layers 62, 66 are also completely permeable to hydrogen gas. The solid layer 64 of hydrogen permeable material can therefore withstand very large pressure differentials between the sides of the solid layer 64 without rupturing.

The first porous hydrogen permeable layer 62 and the second porous hydrogen permeable layer 66 do not obstruct the surface area of the solid layer 64 that is exposed to hydrogen gas. In fact, these porous layers 62, 66 actually increase the effective surface area of the solid layer 64. The first porous hydrogen permeable layer 62 and the second porous hydrogen permeable layer 66 are preferably made of the same material as the deposited solid layer 64. The contact of the first porous hydrogen permeable layer 62 and the second porous hydrogen permeable layer 66 against the solid layer 64, therefore, has the same effect as manufacturing the solid layer 64 with highly textured surfaces. This greatly increases the effective surface area that is exposed to hydrogen gas trying to permeate through the solid layer 64.

Referring to FIG. 3 in conjunction with FIG. 5, it will be understood that, in operation, mixed gas enters the distribution chamber 19. The mixed gases flow evenly through the various perforations in the perforated plate 27. The mixed gases enter the diffusion chamber 22. The mixed gases pass through various gap spaces 48 where the contaminated gas is exposed to the pores in the second porous hydrogen layer 66. The contaminated gas permeates into the second porous hydrogen permeable layer 66 until it contacts the deposited solid layer 64. The deposited solid layer 64 blocks all gases except hydrogen. The hydrogen permeates through the solid layer 64 where the hydrogen gas directly contacts the solid layer 34. However, the hydrogen gas can also permeate into the areas of the second porous hydrogen permeable layer 66 that are contacting and supporting the deposited solid layer 64. As a result, a very large surface area is available through which hydrogen gas can pass.

Once the hydrogen gas permeates across the deposited solid layer 64, it enters the first porous hydrogen permeable layer 62. The first porous hydrogen permeable layer 62 provides very little resistance to the further passage of the now purified hydrogen gas into the interior of the composite collection tube 30.

When the composite hydrogen separator 20 is being cleaned, pressure differentials are reversed. The first porous hydrogen permeable layer 62 then acts to increase the effective surface area of the deposited solid layer 64 as hydrogen gas flows in reverse from the composite collection tubes 30 into the diffusion chamber 22.

Figure 6:
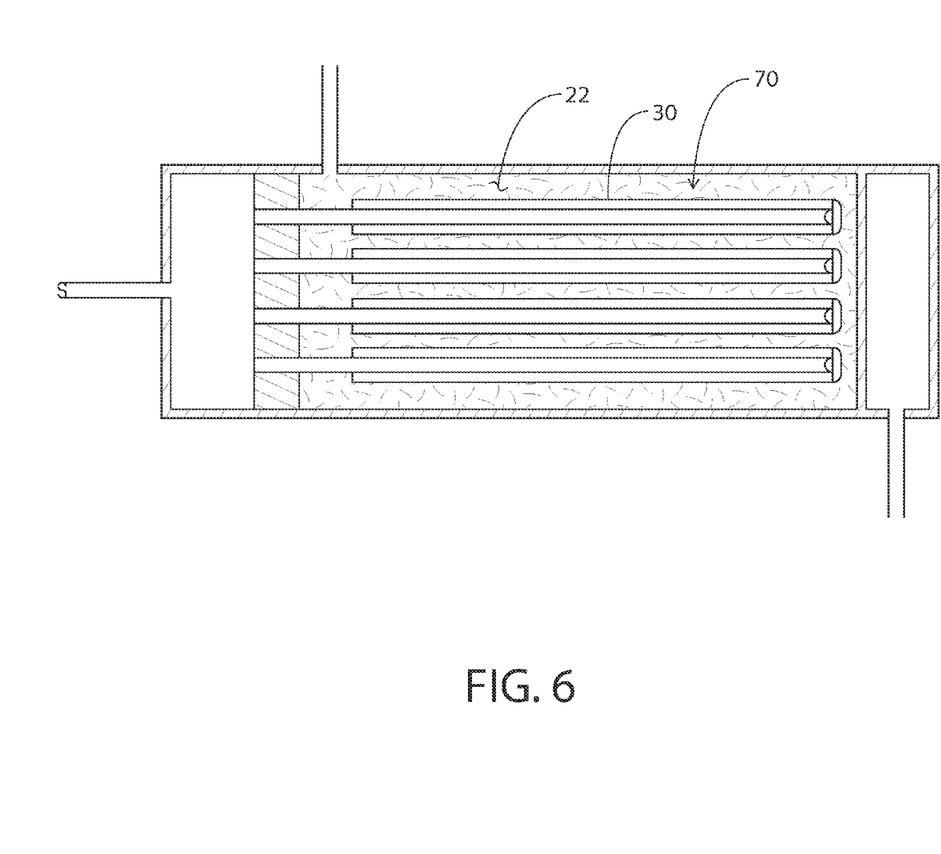
FIG. 6 is a cross-sectional view of an alternate embodiment of a hydrogen separator.

Depending upon the contaminated source gas that is used, it may be desirable to condition the contaminated source gas by passing the contaminated source gas through a catalyst. Referring to FIG. 6, it can be seen that the diffusion chamber 22 of the hydrogen separator can be filled with a catalyst 70. Consequently, any gas that flows into the composite collection tubes 30 must first flow through the catalyst 70. The catalyst 70 selected is dependent upon the contaminated source gas being used. For example, if the contaminated source gas is petroleum distillate, catalysts such as iron chromium oxide, copper zinc oxide and certain noble metals can be used to help break apart the complex hydrocarbons present in such a gas.

It will be understood that the embodiments of the hydrogen separators that are shown are merely exemplary and that a person skilled in the art can make many changes to the shown embodiments. For example, the shown embodiments only have a few composite collection tubes. It will be understood that embodiments of the present invention can be made where hundreds of such tubes are used. All such variations, modifications and alternate embodiments are intended to be included within the present invention as defined by the claims.

What is claimed is:

1. A hydrogen separator assembly for separating hydrogen gas from a mixed gas source, said assembly comprising:
   a distribution chamber for receiving mixed gas from said mixed gas source;
   a diffusion chamber;
   a perforated barrier separating said distribution chamber from said diffusion chamber, wherein said perforated barrier enables said mixed gas to enter said diffusion chamber uniformly across said perforated barrier;
   a waste gas collection chamber;
   a plurality of tubes extending into said diffusion chamber, each of said plurality of tubes having at least one wall segment that is a composite of different layers of material and is permeable only to hydrogen, wherein said different layers of material include a porous tubular support made from a metal that does not react with said mixed gas, and wherein a gap space exists between any of said plurality of tubes that are arranged in adjacent positions;
   a flow restriction barrier separating said diffusion chamber from said waste gas collection chamber, wherein said flow restriction barrier and said perforated barrier limit flow of said mixed gas through said diffusion chamber, therein creating an even flow of said mixed gases through said gap spaces.

2. The assembly according to claim 1, wherein each of said plurality of tubes has a predetermined wall thickness and each said gap space, on average, is between two times and fifty times said predetermined wall thickness.

3. The assembly according to claim 1, wherein said different layers of material includes a solid layer of a hydrogen permeable material selected from a group consisting of palladium and palladium alloy.

4. The assembly according to claim 1, further including a hydrogen collection chamber, wherein each of said plurality of tubes communicates with said common hydrogen collection chamber.

5. The assembly according to claim 4, wherein said diffusion chamber, said distribution chamber, said waste gas collection chamber and said hydrogen collection chamber are contained within a common housing.

6. The assembly according to claim 4, further including a partition wall that separates said hydrogen collection chamber from said waste collection chamber, wherein said plurality of tubes extend as cantilevers into said diffusion chamber from said common partition wall.

7. The assembly according to claim 1, further including a catalyst material contained within said diffusion chamber that reacts with said mixed gas source.

8. A method of separating hydrogen gas from a mixed source gas, comprising the steps of:
   providing a first chamber disposed between a perforated distribution plate and a flow restriction plate;
   providing a plurality of hydrogen permeable tube structures that extend into said first chamber through said flow restriction plate, wherein a gap space exists between any of said plurality of hydrogen permeable tube structures in adjacent positions, wherein each of said hydrogen permeable tube structures is a composite structure that includes a porous tubular support made from a metal that does not react with said mixed source gas; and
   passing the mixed source gas into said first chamber and through said perforated distribution plate and restricting the mixed source gas exiting said first chamber with said flow restriction plate in a manner that creates laminar flow within each said gap space, wherein hydrogen from said mixed source gas permeates into said plurality of hydrogen permeable tube structures and is separated from said mixed source gas.

9. The method according to claim 8, wherein each of said plurality of hydrogen permeable tubes has a predetermined maximum wall thickness and each said gap space is between two times and fifty times said predetermined maximum wall thickness.

10. The method according to claim 8, further including the step of passing said mixed source gas through a catalyst in said first chamber.

11. The method according to claim 8, wherein said step of providing a plurality of hydrogen permeable tube structures includes providing tube structures having layers of materials, wherein at least one of said layers of material is a solid layer of a palladium alloy.

12. The method according to claim 11, wherein said at least one of said layers of materials is a porous layer of a palladium alloy that is bonded to said solid layer of a palladium alloy.

13. The assembly according to claim 3, further including at least one layer of nano particles disposed between said porous tubular support and said solid layer of a hydrogen permeable material, wherein said nano particles are comprised of a hydrogen permeable material.

* * * * *